J. C. CONRAD.
COTTON MACHINE.
APPLICATION FILED APR. 4, 1913.

1,113,311.

Patented Oct. 13, 1914.

WITNESSES:

INVENTOR
Joshua C. Conrad.
BY
ATTORNEY

UNITED STATES PATENT OFFICE.

JOSHUA C. CONRAD, OF CEMENT, OKLAHOMA.

COTTON-MACHINE.

1,113,311.  Specification of Letters Patent.  Patented Oct. 13, 1914.

Application filed April 4, 1913. Serial No. 758,829.

*To all whom it may concern:*

Be it known that I, JOSHUA C. CONRAD, a citizen of the United States, residing at Cement, county of Caddo, and State of Oklahoma, have invented certain new and useful Improvements in Cotton-Machines, of which the following is a specification.

My invention relates to cotton machines, that is, to machines for removing the cotton from the hulls which have been left after ginning.

It is the usual practice, after extracting the bulk of cotton from the hulls and seed by ginning, or by means of other separators, to convey the hulls to the furnace for burning and the seed to the oil mills. A considerable amount of cotton remains in the hulls after ginning or separating and this has heretofore been burned with the hulls; and furthermore there is considerable cotton with the seed when they are conveyed to the oil mills. The seed cotton with the portion of hulls and foreign matter is separated from the seed at the mill and forms the graboles, which are generally used for fuel.

It is the object of my invention to provide a machine particularly adapted to recovering the cotton left in the hulls after leaving the gins or from other separators and the cotton contained in the graboles as it comes from the oil mills.

With these and other objects in view, which will appear hereinafter, my invention consists generally in a plurality of rotary saws, means for feeding the hulls or graboles containing the seed cotton slowly across the face of said saws, means for beating back the hulls and foreign matter from the saws and means for removing the seed cotton from the saws.

It is to be understood that this machine will not gin the cotton, but merely removes the seed cotton from the hulls and foreign matter.

My invention further consists in a certain construction and arrangement of the means for beating back the hulls and foreign matter whereby said means shall also serve to assist in feeding the material through the machine.

My invention further consists in various details of construction and arrangements of parts all as will be fully described hereinafter and particularly pointed out in the claims.

My invention will be more readily understood by reference to the accompanying drawings forming a part of this specification and in which—

Figure 1:
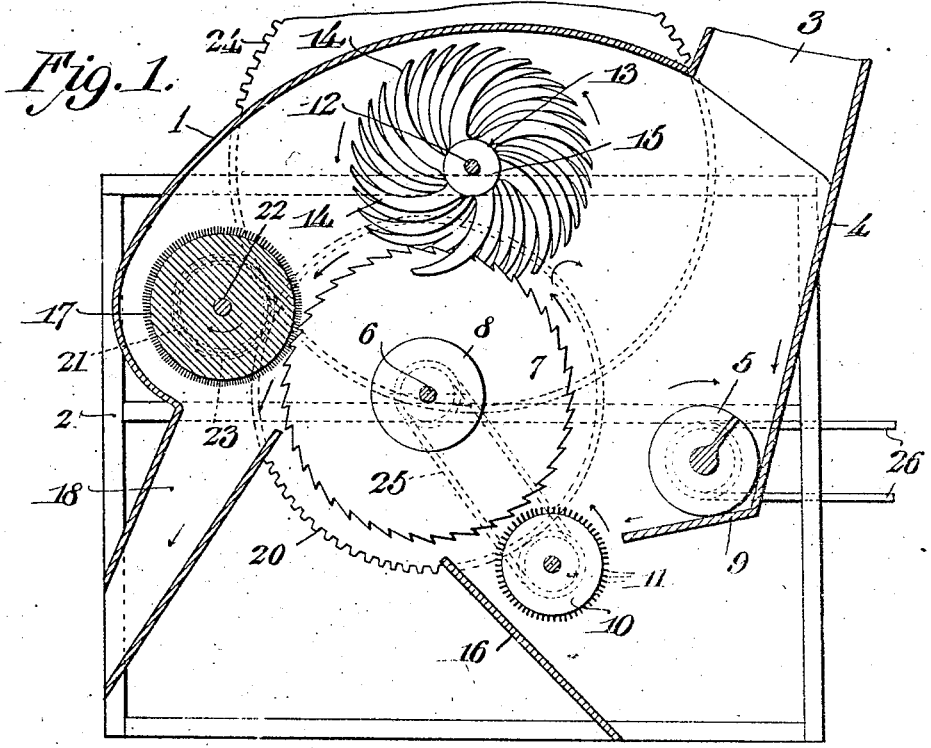
Figure 2:
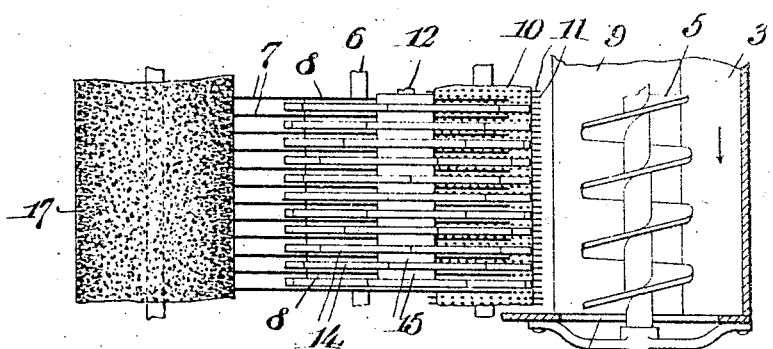

Figure 1 is a vertical transverse section through a cotton machine embodying my invention, and Fig. 2 is a fragmentary plan view of the mechanism a portion of the casing being shown in section.

Referring now to the drawings 1 indicates a suitable casing mounted upon a frame 2 and provided with an inlet opening 3 through which the hulls or "graboles," that is, the seed cotton and other substances screened from the seed at the oil mills, is fed down the breast 4 to a conveyer 5. The conveyer 5 comprises a worm or screw which may be continuous or mutilated as preferred, the object of the conveyer being to carry the material slowly from one end of the machine to the other across the face of the saws as will appear hereinafter.

Extending longitudinally through the casing 1 is a shaft 6 upon which is mounted a plurality of saws 7 spaced apart by intermediate blocks 8. The teeth of the saws are preferably considerably larger and more under cut than the teeth of the usual gin saws. Directly beneath the conveyer screw 5 is a bottom member 9 inclining slightly toward the saws and substantially in a plane with the bottom of said saws so that the material being carried through the machine by the conveyer will naturally fall toward the lower portion of the saws. The inclined bottom 9 terminates at a distance from the saws and between said bottom and the saws is arranged a picker cylinder 10 provided with a plurality of radially extending spikes or pickers 11 which carry the hulls or graboles into immediate engagement with the saws. As soon as this material, which is usually wasted, is brought into contact with the saws, the teeth of the saws engage the fibers of cotton contained therein and carry the same upwardly together with a portion of the hulls and trash and means must be provided to prevent the adhering hulls and trash from being carried through the machine with the cotton and adhering seed.

Arranged above the saws 7 is a shaft 12, parallel with the saw shaft 6, and upon which is mounted a suitable beater which will knock the hulls and trash loose from the fiber on the saws and back to the conveyer 5. Although the beater may be of various forms, I prefer that illustrated in the drawings. As shown therein the beater comprises a plurality of similar members fixed to the shaft 12 and each consisting of a hub 13 and a plurality of arms 14 which are preferably curved as shown. These members are spaced apart by blocks 15 so as to alternate with the saws with the ends of the arms extending between the same, an arrangement clearly illustrated in Fig. 2 of the drawing. In order that the beater may more effectually assist the conveyer 5 in agitating the material and carrying the same through the machine I arrange the beater members on the shaft with the arms of each slightly in advance of the arms of the preceding member so as to form a spiral or helical arrangement. An incline 16 is provided beneath the picker cylinder 10 to convey from the machine the hulls that drop between the cylinder and the saws and member 9.

Arranged behind the saws 7 is a brush 17 for removing the seed cotton from the saws and depositing the same in an outlet duct or passage-way 18.

At the end of the machine opposite the inlet 3 the casing is left open at the end of the conveyer as at 19 in order that the defibered hulls and foreign matter may be readily discharged.

The machine may be geared up in any suitable manner, that is, either of the shafts may constitute the power shaft and the others derive their motion therefrom. In practice I prefer to drive the saw shaft 6 as the power shaft. Said shaft is provided with a gear 20 meshing with a gear 21 on the shaft 22 of the brush 17 and the shaft 22 is equipped with a second gear 23 meshing with a large gear 24 on the beater shaft 12. Sprocket gearing 25 connects the shaft with the picker cylinder 10 and the conveyer 5 is preferably independently driven by a belt 26.

The purpose of my invention is to be distinctly understood as that of providing means for removing the cotton fibers from the hull and graboles which has heretofore been wasted. It is in no sense to be considered as a cotton cleaning machine or a machine for handling the cotton as picked, as it cannot be practically or profitably operated for this purpose. However, for the purpose for which it is intended I have, by actual practice been able to save from $15.00 to $60.00 worth of cotton per day for each machine in operation, which cotton is in the usual process destroyed or wasted.

Having described my invention, I claim:—

1. A machine for removing seed cotton from the hulls delivered from the gins or other separators, or from graboles, comprising a casing, a plurality of spaced rotary saws in said casing, a screw conveyer in said casing adapted to rotate on an axis parallel with that of the saws to convey the material slowly across the face of the latter, a bottom below said conveyer inclined toward said saws, and terminating at a distance therefrom, a picker cylinder arranged between said saws and adjacent edge of said bottom, and a beater arranged above said saws, the casing at the discharge end of said screw conveyer being open, substantially as described.

2. A machine for removing seed cotton from the hulls delivered from the gins or other separators or from graboles, comprising a plurality of spaced rotary saws, a screw conveyer for carrying the material across the face of said saws and a beater comprising a plurality of spaced rotary members each consisting of a hub and a plurality of arms, the arms of each of said members being arranged in advance of those of the preceding member to produce a spiral formation, substantially as and for the purpose specified.

3. A machine for removing seed cotton from the hulls, comprising a casing, a plurality of spaced rotary saws in said casing, a screw conveyer in said casing adapted to rotate on an axis parallel with that of the saws to convey the material slowly across the face of the latter, a picker cylinder between said conveyer and said saws for conveying the material from the former to the latter, and a beater arranged above and cooperating with the saws to remove hulls and trash from the saws to deposit them in the conveyer, the casing at the discharge end of said screw conveyer being open whereby the hulls and trash are delivered from the machine, substantially as described.

In testimony whereof I have signed my name to this specification in the presence of two subscribing witnesses.

JOSHUA C. CONRAD.

Witnesses:
A. E. ROLAND,
CHAS. HOPPIN.